(12) United States Patent
Chen et al.

(10) Patent No.: US 10,591,764 B2
(45) Date of Patent: Mar. 17, 2020

(54) DISPLAY DEVICE HAVING A TOUCH ELECTRODE IN THE PERIPHERAL AREA

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaochuan Chen, Beijing (CN); Lei Wang, Beijing (CN); Rui Xu, Beijing (CN); Ming Yang, Beijing (CN); Pengcheng Lu, Beijing (CN); Haisheng Wang, Beijing (CN); Changfeng Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/309,266

(22) PCT Filed: Feb. 3, 2016

(86) PCT No.: PCT/US2016/073281
§ 371 (c)(1),
(2) Date: Nov. 7, 2016

(87) PCT Pub. No.: WO2017/045339
PCT Pub. Date: Mar. 23, 2017

(65) Prior Publication Data
US 2017/0269437 A1    Sep. 21, 2017

(30) Foreign Application Priority Data
Sep. 15, 2015 (CN) .......................... 2015 1 0587675

(51) Int. Cl.
*G02F 1/1343* (2006.01)
*G02F 1/1333* (2006.01)
(Continued)

(52) U.S. Cl.
CPC .......... *G02F 1/13338* (2013.01); *G06F 3/044* (2013.01); *G06F 3/0412* (2013.01);
(Continued)

(58) Field of Classification Search
CPC ................................................ G02F 1/134309
(Continued)

(56) References Cited

U.S. PATENT DOCUMENTS

| | | | |
|---|---|---|---|
| 2010/0053118 A1* | 3/2010 | Chen ...................... | G06F 1/1601 345/175 |
| 2010/0182273 A1* | 7/2010 | Noguchi ............. | G02F 1/13338 345/174 |

(Continued)

FOREIGN PATENT DOCUMENTS

| | | |
|---|---|---|
| CN | 104375681 A | 2/2015 |
| CN | 104484085 A | 4/2015 |

(Continued)

OTHER PUBLICATIONS

Search Report and Written Opinion dated Jun. 14, 2016 from State Intellectual Property Office of the P.R. China.
Chinese Office Action dated Jan. 17, 2017.

*Primary Examiner* — Long D Pham
(74) *Attorney, Agent, or Firm* — Dilworth & Barrese, LLP.; Michael J. Musella, Esq.

(57) ABSTRACT

An array substrate, a display panel and a display device are disclosed. An array substrate includes a base substrate; the base substrate includes a display area and a peripheral area encircling the display area; a pixel array structure is disposed in the display area; arid at least one touch electrode is
(Continued)

disposed in the peripheral area and arranged along an edge of the base substrate. In the array substrate, a touch electrode is disposed in a peripheral area, so that the objective of replacing physical keys can be achieved, and hence the bezel width of the display device employing the array substrate can be reduced.

12 Claims, 7 Drawing Sheets

(51) Int. Cl.
    *G06F 3/044*     (2006.01)
    *G06F 3/041*     (2006.01)

(52) U.S. Cl.
    CPC .......... *G02F 2001/133388* (2013.01); *G06F 2203/04103* (2013.01)

(58) Field of Classification Search
    USPC .......................................... 345/174
    See application file for complete search history.

(56) References Cited

U.S. PATENT DOCUMENTS

| | | | |
|---|---|---|---|
| 2011/0134052 A1* | 6/2011 | Tsai | G06F 3/044 345/173 |
| 2012/0139874 A1* | 6/2012 | Ozeki | G06F 3/0412 345/174 |
| 2013/0231046 A1* | 9/2013 | Pope | G06K 9/00013 455/41.1 |
| 2014/0225843 A1 | 8/2014 | Kuo | |
| 2015/0145812 A1* | 5/2015 | Sun | G06F 3/044 345/174 |
| 2016/0202813 A1* | 7/2016 | Lee, II | G06F 3/044 345/174 |
| 2017/0098113 A1* | 4/2017 | Lee | G06K 9/0002 |
| 2017/0308200 A1* | 10/2017 | Mugiraneza | G06F 3/044 |

FOREIGN PATENT DOCUMENTS

| | | |
|---|---|---|
| CN | 104536197 A | 4/2015 |
| CN | 105093725 A | 11/2015 |

* cited by examiner

DISPLAY DEVICE HAVING A TOUCH ELECTRODE IN THE PERIPHERAL AREA

TECHNICAL FIELD

At least one embodiment of the present disclosure relates to an array substrate, a display panel and a display device.

BACKGROUND

Along with the continuous development of display devices, particularly mobile display devices, common physical keys are continuously replaced by other means in these devices, and people tend to adopt lighter and thinner, more sensitive and more fashionable virtual keys to achieve the control and input for the display devices. Moreover, along with users' higher and higher requirements on the narrow bezels of display devices, almost all the mobile phones and tablet PCs pursue for narrow bezels, so as to improve the screen-to-body ratio and hence improve user experience. However, common mobile display devices still have physical keys, e.g., VOLUME and ON/OFF, on the upper side and/or the left side and/or the right side of a bezel. As the physical keys have larger sizes, the display devices cannot further reduce the bezel width.

SUMMARY

At least one embodiment of the present disclosure provides an array substrate, a display panel and a display device. In the array substrate, a touch electrode or touch electrodes are disposed in a peripheral area, so that the objective of replacing physical keys can be achieved, and hence the bezel width of the display device employing the array substrate can be reduced.

At least one embodiment of the present disclosure provides an array substrate, comprising a base substrate, wherein the base substrate includes a display area and a peripheral area encircling the display area; a pixel array structure is disposed in the display area; and at least one touch electrode is disposed in the peripheral area and arranged along an edge of the base substrate.

For example, in the array substrate provided by at least one embodiment of the present disclosure, the edge of the at least one touch electrode is parallel and flush with the edge of the base substrate.

For example, in the array substrate provided by at least one embodiment of the present disclosure, the pixel array structure includes at least one layer of conductive structure; and the at least one touch electrode is arranged in the same layer as any layer in the at least one layer of conductive structure.

For example, in the array substrate provided by at least one embodiment of the present disclosure, the conductive structure includes any one selected from the group consisting of a pixel electrode layer, a common electrode layer, a gate electrode layer and a source/drain electrode layer.

For example, in the array substrate provided by at least one embodiment of the present disclosure, the pixel array structure includes a plurality of layers of conductive structures; the touch electrode includes a plurality of touch sub-electrodes; the plurality of touch sub-electrodes are respectively arranged in the same layer as any one layer of conductive structure in the plurality of layers of conductive structures; and the plurality of touch sub-electrodes are electrically connected with each other.

For example, in the array substrate provided by at least one embodiment of the present disclosure, the conductive structure includes a plurality of layers selected from the group consisting of the pixel electrode layer, the common electrode layer, the gate electrode layer and the source/drain electrode layer.

For example, in the array substrate provided by at least one embodiment of the present disclosure, the number of the touch electrodes is plural; and the plurality of touch electrodes are arranged in the same layer or different layers.

For example, in the array substrate provided by at least one embodiment of the present disclosure, a first conductive particle layer is disposed on the at least one touch electrode, arranged in the peripheral area of the base substrate, and electrically connected with the corresponding touch electrode.

For example, the array substrate provided by at least one embodiment of the present disclosure further comprises at least one lead which is respectively electrically connected with the at least one touch electrode for signal input/output.

For example, in the array substrate provided by at least one embodiment of the present disclosure, the pixel array structure includes at least one layer of conductive structure; and the at least one lead is arranged in the same layer as the at least one layer of conductive structure.

For example, in the array substrate provided by at least one embodiment of the present disclosure, the conductive structure includes at least one selected from the group consisting of the pixel electrode layer, the common electrode layer, the gate electrode layer and the source/drain electrode layer.

For example, in the array substrate provided by at least one embodiment of the present disclosure, the at least one lead is connected with a touch detection chip.

For example, in the array substrate provided by at least one embodiment of the present disclosure, the at least one touch electrode is a self-capacitive electrode; or the number of the touch electrodes is plural, and the plurality of touch electrodes include touch drive electrodes and touch sensing electrodes.

At least one embodiment of the present disclosure provides a display panel, comprising an array substrate and an opposing substrate which are cell-assembled together, wherein the array substrate is the any one of the array substrates.

For example, the display panel provided by at least one embodiment of the present disclosure further comprises a second conductive particle layer disposed between the at least one touch electrode of the array substrate and the opposing substrate, and the second conductive particle layer is disposed on the at least one touch electrode in the peripheral area and correspondingly electrically connected with the touch electrode.

For example, in the display panel provided by at least one embodiment of the present disclosure, the second conductive particle layer includes anisotropic conductive adhesive.

At least embodiment of the present disclosure provides a display device, comprising any one of the display panels.

For example, the display device provided by at least one embodiment of the present disclosure further comprises a backplane, wherein the backplane includes a bottom plate and a plurality of side plates disposed on the periphery of the bottom plate; and a hollowed-out structure is disposed at the position of a side plate corresponding to the at least one touch electrode.

BRIEF DESCRIPTION OF THE DRAWINGS

In order to clearly illustrate the technical solution of the embodiments of the disclosure, the drawings of the embodi

Reference numerals of the accompanying drawings:

101—base substrate; 1011—display area; 1012—peripheral area; 102—gate electrode/conductive structure; 103—gate insulating layer; 104—active layer; 105—source electrode/conductive structure; 106—drain electrode/conductive structure; 107—passivation layer; 108—common electrode/conductive structure; 109—pixel electrode/anode/conductive structure; 110—insulating layer; 111—touch electrode; 1111—first touch electrode; 1112—second touch electrode; 1113—third touch electrode; 1114—fourth touch electrode; 1110—touch sub-electrode; 11101—first touch sub-electrode; 11102—second touch sub-electrode; 120—pixel array structure; 125—lead; 130—touch detection chip; 140—sealant; 150—liquid crystal layer; 160—opposing substrate; 180—first conductive particle layer; 183—second conductive particle layer; 190—backplane; 191—bottom plate; 192—side plate; 193—hollowed-out structure; 1931—first hollowed-out structure; 1932—second hollowed-out structure; 199—display surface.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
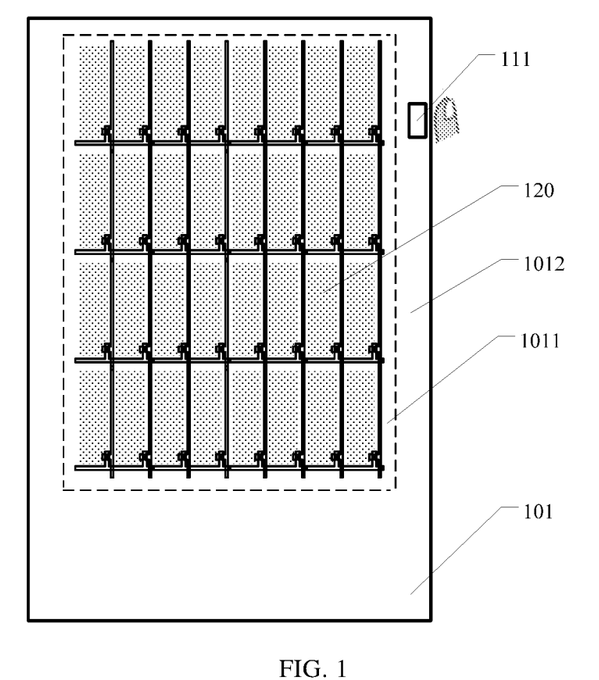
- FIG. 1 is a schematic plan view illustrating the setting position of a touch electrode in an array substrate provided by one embodiment of the present disclosure.

At least one embodiment of the present disclosure provides an array substrate, a display panel comprising the array substrate, and a display device comprising the display panel. As illustrated in FIG. 1, the array substrate comprises a base substrate 101. The base substrate 101 includes a display area 1011 and a peripheral area 1012 encircling the display area 1011; a pixel array structure 120 is disposed in the display area 1011; and at least one touch electrode 111 is disposed in the peripheral area 1012 and arranged along the edge of the base substrate 101. "At least one touch electrode" includes one touch electrode or a plurality of touch electrodes. "A plurality of", for instance, refers to more than one. Description is given in FIG. 1 by taking the case that the number of the touch electrodes is one as an example However, a plurality of touch electrodes 111 may also be disposed in the peripheral area 1012.

In the array substrate, as the at least one touch electrode is disposed in the peripheral area and arranged along the edge of the base substrate, the objective of replacing physical keys can be achieved, and hence the bezel width of a display panel and the display device employing the array substrate can be reduced.

For instance, the at least one touch electrode may be independently formed by one or a plurality of layers of conductive films and may be arranged in the same layer as common conductive structures (e.g., a pixel electrode layer, a common electrode layer, a gate electrode layer and a source/drain electrode layer) in the array substrate.

It should be understood here that: in the present disclosure, "the same layer" refers to a layer structure formed by a layer for forming specific patterns that is formed by a same film forming process and patterned in one patterning process via a same mask. According to different specific patterns, one patterning process may include a plurality of exposure, development or etching processes, and the specific patterns in the formed layer structure may be continuous or discontinuous. The specific patterns may also be at different heights or have different thicknesses.

It should be noted that: in the embodiment of the present disclosure, patterning or the patterning process may only include a photolithography process, or may include a photolithography process and an etching process, or may include printing, ink-jetting or the like processes for forming the specific patterns. Photolithography refers to the process of forming patterns by technological processes such as film forming, exposure and development by means of photoresist, mask, and an exposure machine. Corresponding patterning processes may be selected according to the formed structure in the embodiment of the present disclosure.

Description will be given below with reference to several embodiments.

First Embodiment

Figure 2:
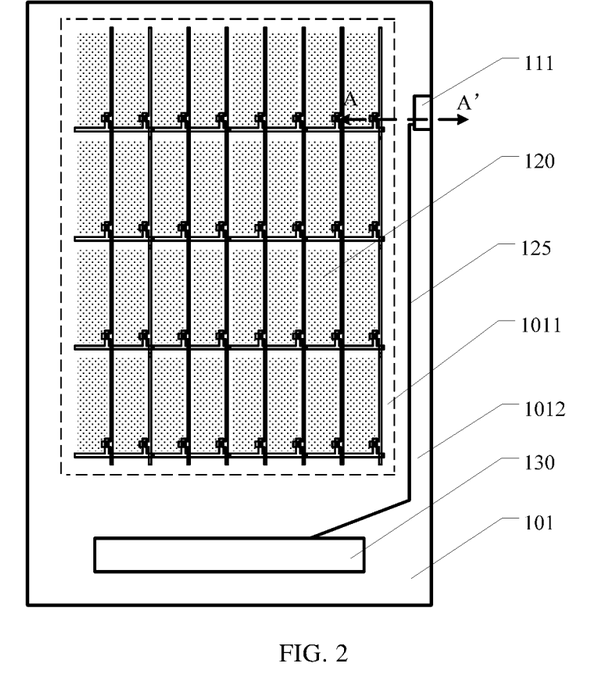
FIG. 2 is a schematic plan view of an array substrate provided by one embodiment of the present disclosure.

The embodiment provides an array substrate. As illustrated in FIG. 2, the array substrate comprises a base substrate 101. The base substrate 101 includes a display area 1011 and a peripheral area 1012 encircling the display area 1011; a pixel array structure 120 is disposed in the display area 1011; and at least one touch electrode 111 is disposed in the peripheral area 1012 and arranged along the edge of the base substrate 101. Moreover, the edge of the at least one touch electrode 111 is parallel and flush with the edge of the base substrate 101.

It should be noted that: in the array substrate provided by the embodiment, as the edge of the touch electrode 111 is parallel and flush with the edge of the base substrate 101, the touch electrode 111 can be closer to the bezel of a display panel/display device employing the array substrate, and hence the touch sensitivity of the touch electrode 111 can be improved.

Figure 3:
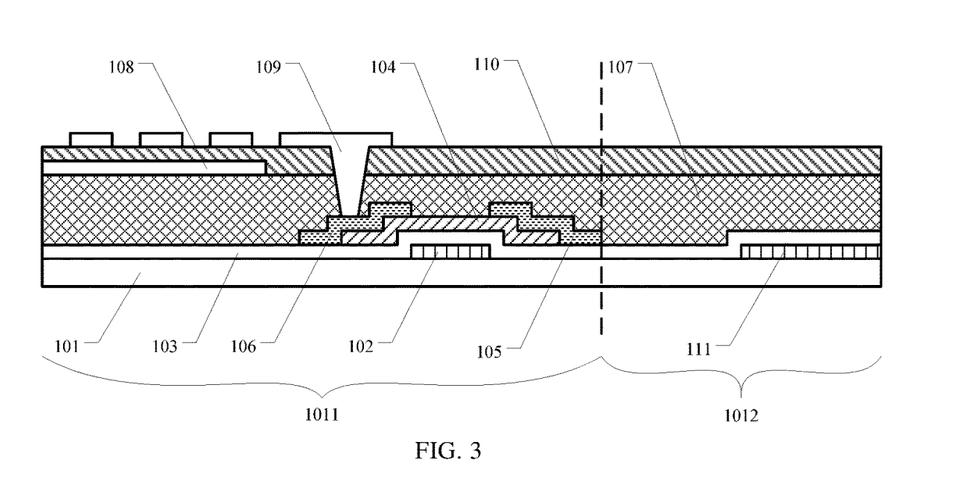
FIG. 3 is a schematic partial sectional view of an array substrate provided by one embodiment of the present disclosure along the direction A-A' in FIG. 2.

FIG. 3 is a schematic partial sectional view of an array substrate provided by the embodiment along the direction A-A' in FIG. 2. As illustrated in FIG. 3, the array substrate comprises a base substrate 101. The base substrate 101 includes a display area 1011 and a peripheral area 1012. The base substrate 101 includes gate electrodes 102 disposed in the display area 1011 of the base substrate 101, a gate insulating layer 103 covering the gate electrodes 102, active layers 104 disposed at positions on the gate insulating layer 103 corresponding to the gate electrodes 102, source electrodes 105 and drain electrodes 106 that are disposed on the active layers 104, arranged on both sides of the active layers 104, and make contact with the active layers, a passivation layer 107 covering the entire base substrate 101, common electrodes 108 disposed in the display area 1011 on the passivation layer 1011, an insulating layer 110 disposed on the common electrodes 108, and pixel electrodes 109 disposed in the display area 1011 on the insulating layer 110. It should be noted that FIG. 3 only illustrates an ADS mode array substrate and the array substrate provided by the embodiment is not limited thereto.

For instance, the array substrate may be taken as an array substrate of a liquid crystal display (LCD) device and may also be taken as an array substrate of an organic light-emitting diode (OLED) display device, an e-paper display device, or the like. For instance, the base substrate 101 may be a glass substrate, a quartz substrate, a plastic substrate or another substrate.

For instance, the gate electrode 102 is made from one or more selected from the group consisting of aluminum, titanium, tantalum, chromium, molybdenum, molybdenum tungsten, or one or more of any alloys of the above metals. For instance, the source electrode 105 and the drain electrode 106 are made from one or more selected from the group consisting of aluminum, titanium, tantalum, chromium, molybdenum, molybdenum tungsten, or one or more of any alloys of the above metals. For instance, the common electrode 108 and the pixel electrode 109 may be made from a transparent metal oxide such as indium tin oxide (ITO) or indium zinc oxide (IZO). That is to say, the gate electrode 102, the source electrode 105, the drain electrode 106, the common electrode 108 and the pixel electrode 109 may all be conductive structures.

The array substrate provided by the embodiment further comprises at least one touch electrode 111. As illustrated in FIG. 3, the array substrate comprises one touch electrode 111. The touch electrode 111 is disposed in the peripheral area 1012 on the base substrate 101. The touch electrode 111 is arranged along the edge of the base substrate 101 and is parallel and flush with the edge of the base substrate 101. It should be noted that the touch electrode 111 may also be not parallel and flush with the edge of the base substrate 101. No limitation will be given here.

For instance, as illustrated in FIG. 3, in one example of the embodiment, the touch electrode 111 may be arranged in the same layer as the gate electrodes 102. That is to say, the touch electrode 111 and the gate electrodes 102 may be formed by the same gate metal layer via one patterning process.

Figure 4:
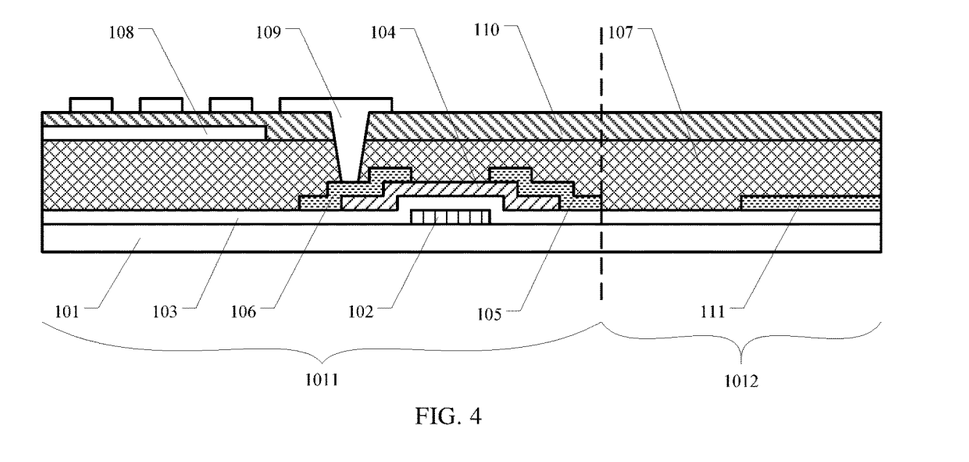
FIG. 4 is a schematic partial sectional view of another array substrate provided by one embodiment of the present disclosure along the direction A-A' in FIG. 2.

For instance, as illustrated in FIG. 4, in one example of the embodiment, the touch electrode 111 may be arranged in the same layer as the source electrodes 105 and the drain electrodes 106. That is to say, the touch electrode 111 and the source electrodes 105 and the drain electrodes 106 may be formed by the same source/drain metal layer via one patterning process.

Figure 5:
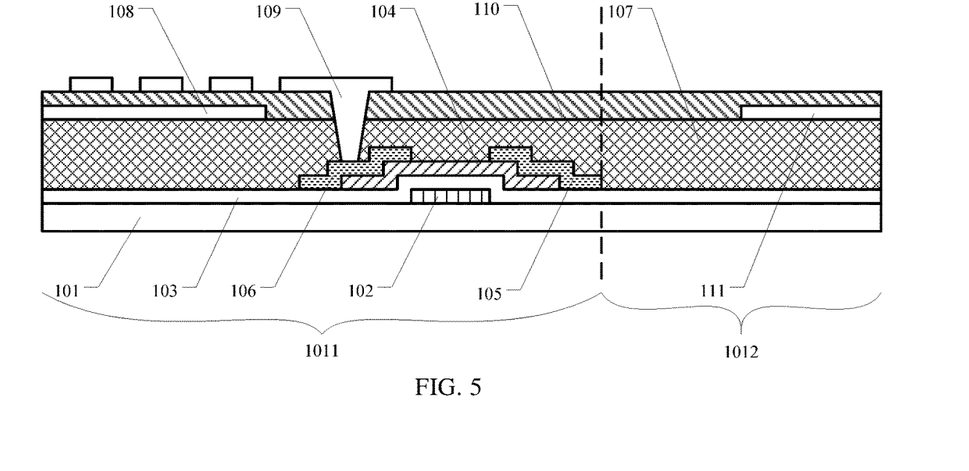
FIG. 5 is a schematic partial sectional view of another array substrate provided by one embodiment of the present disclosure along the direction A-A' in FIG. 2.

For instance, as illustrated in FIG. 5, in one example of the embodiment, the touch electrode 111 may be arranged in the same layer as the common electrodes 108. That is to say, the touch electrode 111 and the common electrodes 108 may be formed by the same transparent metal oxide layer via one patterning process Similarly, the touch electrode 111 may also be arranged in the same layer as the pixel electrodes 109. No further description will be given here.

That is to say, the touch electrode 111 may be arranged in the same layer as any one layer of conductive structure in the array substrate. It should be noted that the touch electrode 111 may also be independently arranged. In the array substrate provided by the embodiment, as the touch electrode 111 is arranged in the same layer as any one layer of conductive structure in the array substrate, the material and the process of forming the touch electrode 111 can be saved, and hence the cost can be reduced.

It should be noted that the conductive structures include but not limited to the pixel electrode layer, the common electrode layer, the gate electrode layer, and the source/drain electrode layer. The conductive structures may also include other conductive structure(s) disposed in the display area. For instance, when the array substrate is an array substrate of an in-cell touch display device, the conductive structures include touch electrodes (touch drive electrodes or touch sensing electrodes) in the display area, corresponding leads or the like.

Description is given in FIG. 2 by taking the case that the number of the touch electrode(s) is one as an example A plurality of touch electrodes 111 may be also disposed in the peripheral area 1012.

For instance, the array substrate provided by one example of the embodiment further comprises at least one lead 125 which is electrically connected with the at least one touch electrode 111 for signal input/output. For instance, as illustrated in FIG. 2, the array substrate comprises one lead 125 which is electrically connected with the touch electrode 111. In the array substrate provided by the embodiment, the lead 125 may be arranged in the same layer as any one layer of conductive structure in the array substrate and formed by the same conductive layer via the patterning process. It should be noted that the lead 125 may also be independently arranged. In the array substrate provided by the embodiment, as the lead 125 is arranged in the same layer as any one layer of conductive structure in the array substrate, the material and the process of forming the lead 125 can be saved, and hence the cost can be reduced.

In addition, the lead 125 may be arranged in the same layer as the touch electrode 111 and may also be arranged in different layers from the touch electrode 111. For instance, the lead 125 and the touch electrode 111 are arranged in different layers and electrically connected with each other via general connection means such as through holes.

For instance, the array substrate provided by one example of the embodiment further comprises a touch detection chip 130. For instance, as illustrated in FIG. 2, the array substrate comprises a touch detection chip 130 which is disposed in the peripheral area 1012 of the base substrate 101 and connected with the lead 125, namely the touch electrode 111 is connected with the touch detection chip 130 via the lead 125.

In the array substrate provided by the embodiment, the touch electrode 111 may be a self-capacitive touch electrode. When a finger touches the position of the touch electrode 111 on a side (the side, for instance, is in the thickness direction of the base substrate; the thickness direction of the base substrate, for instance, refers to the direction perpendicular to a display surface; the following embodiments are the same) of a display panel/display device employing the array substrate provided by the embodiment, the capacitance of the finger is coupled to the touch electrode 111, so that the capacitance of the touch electrode 111 can be changed. The touch detection chip 130 determines the touch position by detecting the capacitance variation of the self-capacitive electrodes, so as to achieve the touch control of the display panel/display device employing the array substrate provided by the embodiment. For instance, when a plurality of touch electrodes 111 are arranged, the touch electrodes may also be provided as mutual-capacitance touch electrodes, and the touch detection chip 130 is configured to realize detection correspondingly.

Second Embodiment

Figure 6:
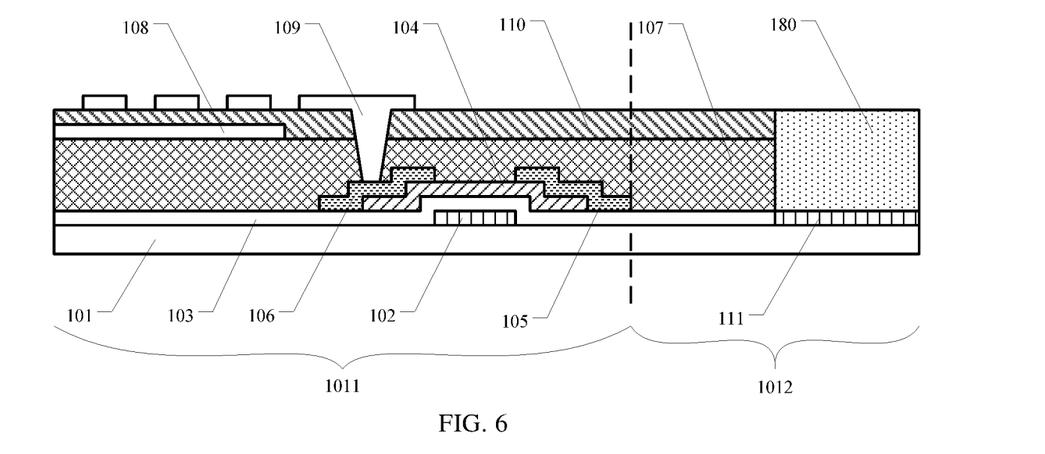
FIG. 6 is a schematic partial sectional view of another array substrate provided by one embodiment of the present disclosure along the direction A-A' in FIG. 2.
Figure 7:
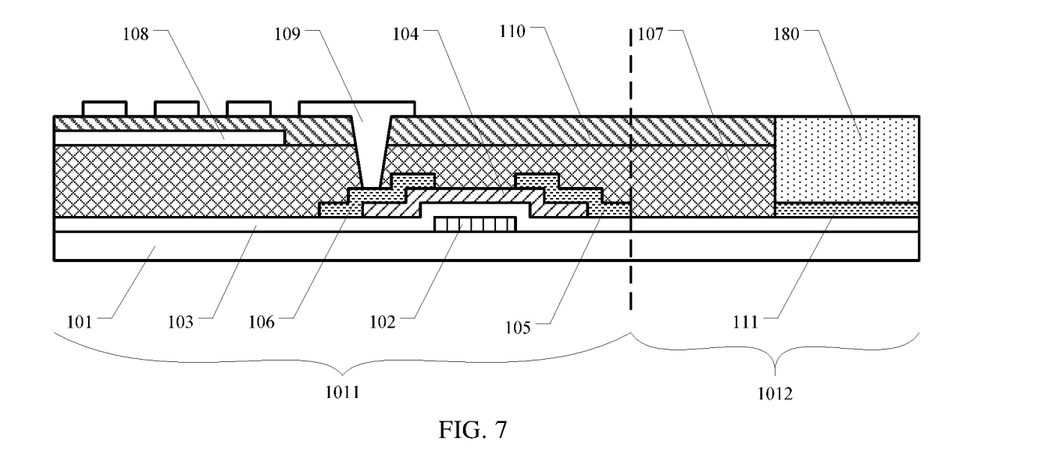
FIG. 7 is a schematic partial sectional view of another array substrate provided by one embodiment of the present disclosure along the direction A-A' in FIG. 2.

The embodiment provides an array substrate. The array substrate comprises a base substrate 101, a pixel array structure 120, a touch electrode 111, a gate electrode 102, a gate insulating layer 103, an active layer 104, a source electrode 105, a drain electrode 106, a passivation layer 107, a common electrode 108, an insulating layer 110, and a pixel electrode 109. The positional relationships and the connection relationships of the above components may refer to the relevant description of FIG. 3 in the first embodiment. No further description will be given here. As illustrated in FIGS. 6 and 7, the array substrate provided by the embodiment further comprises a first conductive particle layer 180 disposed on at least one touch electrode 111. The first conductive particle layer 180 is arranged in a peripheral area 1012 of the base substrate 101 and electrically connected with the corresponding touch electrode 111.

For instance, as illustrated in FIG. 6, in one example of the embodiment, the touch electrode 111 is arranged in the same layer as the gate electrodes 102 and arranged along the edge of the base substrate 101. The edge of the touch electrode 111 is parallel and flush with the edge of the base substrate 101. The array substrate further comprises a first conductive particle layer 180 disposed on the touch electrode 111. The first conductive particle layer 180 may be directly formed on the touch electrode 111, so as to be electrically connected with the touch electrode 111. It should be noted that the conductive particle layer 180, for instance, may achieve electrical connection via a through hole or other connection structure.

For instance, as illustrated in FIG. 7, in one example of the embodiment, the touch electrode 111 is arranged in the same layer as the source electrodes 105 and the drain electrodes 106 and arranged along the edge of the base substrate 101. The edge of the touch electrode 111 is parallel and flush with the edge of the base substrate 101. The array substrate further comprises a first conductive particle layer 180 disposed on the touch electrode 111. The first conductive particle layer 180 may be directly formed on the touch electrode 111, so as to be electrically connected with the touch electrode 111. It should be noted that the conductive particle layer 180, for instance, may achieve electrical connection via a through hole or other connection structure.

For instance, the touch electrodes may also adopt the first conductive particle layers. The first conductive particle layers may be respectively connected with the touch detection chip via the leads. In this case, the setting ways of the leads may refer to the description of the setting ways of the leads in the embodiments.

For instance, the conductive particle layer 180 may include anisotropic conductive adhesive. The anisotropic conductive adhesive may be conductive in one direction but not conductive in other directions, for instance, may be conductive in the thickness direction (the direction perpendicular to a display surface, namely the vertical direction) of the base substrate and not conductive in the horizontal direction (the direction parallel to the display surface).

For instance, the conductive particle layer 180, for instance, may adopt an adhesive containing conductive particles, e.g., an adhesive formed by mixing conductive particles and epoxy resin adhesive. The conductive particles may include but not limited to carbon particles, silver particles, gold particles, nickel particles, or the like. For instance, a through hole is formed on the touch electrode 111, and a conductive silver adhesive or a sealant doped with conductive metal balls is filled in the through hole to form the conductive particle layer 180. Of course, the conductive particle layer 180 may also adopt other conductive particles. For instance, the conductive particles are encapsulated by an insulating layer. In the pressing process, the insulating layer encircling the conductive particles in the vertical direction is broken, so that the electrical connection can be achieved in the vertical direction. As the insulating layer still encircles the conductive particles in the horizontal direction, the conductive particle layer is not conductive.

The anisotropic conductive adhesive, for instance, become conductive at a position in the vertical direction after, for instance, being pressed at the specific position in the direction perpendicular to the display surface.

For instance, the conductive particle layer 180 may also be conductive in the case of no pressure. For instance, the conductive layer formed by the conductive particles may be adopted.

In the array substrate provided by the embodiment, as the first conductive particle layer 180 is formed on the touch electrode 111, the sensing range of the touch electrode 111 in the vertical direction, namely the thickness direction of the array substrate, can be increased, and hence the touch sensitivity of the touch electrode 111 can be improved.

For instance, the array substrate provided by one example of the embodiment further comprises at least one lead 125 and a touch detection chip 130. The specific setting ways and the positional relationships refer to the relevant description in the first embodiment. No further description will be given here.

In the array substrate provided by the embodiment, the touch electrode 111 may be a self-capacitive touch electrode. When a finger touches the position of the touch electrode 111 on a side (in the direction perpendicular to the display surface) of a display device employing the array substrate provided by the embodiment, the capacitance of the finger senses the conductive particle layer 180 and the touch electrode 111, so that the capacitance of the touch electrode 111 can be changed. The touch detection chip 130 determines the touch position by detecting the capacitance variation of the self-capacitive electrodes, so as to achieve the touch control of a display panel/display device employing the array substrate provided by the embodiment. For instance, when a plurality of touch electrodes 111 are arranged, the touch electrodes may also be provided as mutual-capacitance touch electrodes, and the touch detection chip 130 is configured to provide corresponding detection.

Third Embodiment

The embodiment provides an array substrate. The array substrate comprises a base substrate 101, a pixel array structure 120, a touch electrode 111, a gate electrode 102, a gate insulating layer 103, an active layer 104, a source electrode 105, a drain electrode 106, a passivation layer 107, a common electrode 108, an insulating layer 110, and a pixel electrode 109. The positional relationships and the connection relationships of the above components may refer to the relevant description in the first embodiment. No further description will be given here. In the array substrate provided by the embodiment, the touch electrode 111 includes a plurality of touch sub-electrodes which are respectively arranged in the same layer as any one layer of conductive structure in a plurality of layers of conductive structures and electrically connected with each other.

Figure 8:
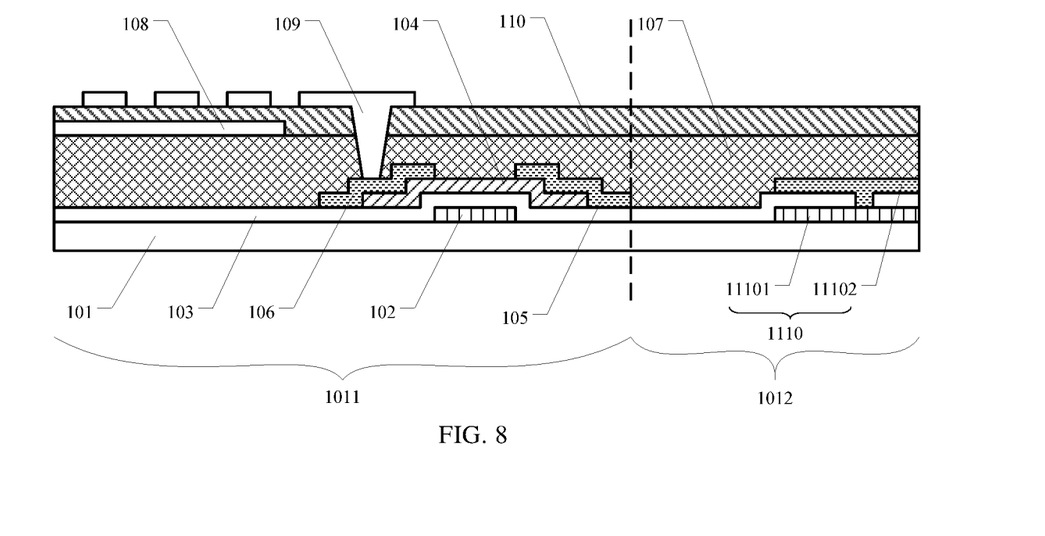
FIG. 8 is a schematic partial sectional view of another array substrate provided by one embodiment of the present disclosure along the direction A-A' in FIG. 2.

For instance, the touch electrode 111 may include a plurality of touch sub-electrodes. For instance, as illustrated in FIG. 8, the touch electrode 111 may include two touch sub-electrodes 1110: a first touch sub-electrode 11101 and a second touch sub-electrode 11102. The first touch sub-electrode 11101 is arranged in the same layer as the gate electrodes 102. The second touch sub-electrode 11102 is arranged in the same layer as the source electrodes 105 and the drain electrodes 106. Moreover, the first touch sub-electrode 11101 and the second touch sub-electrode 11102 are electrically connected with each other.

It should be noted that the number of the touch sub-electrodes is not limited to two and may be more. The touch sub-electrodes are not limited to be arranged in the same layer as the gate electrode layer and the source/drain electrodes. For instance, the touch sub-electrodes may also be arranged in the same layer as a common electrode layer and/or a pixel electrode layer. Of course, the touch sub-electrodes may also be independently arranged or arranged in the same layer as other conductive structures.

In the array substrate provided by the embodiment, on one hand, as the touch electrode 111 includes the plurality of touch sub-electrodes, the sensing range of the touch electrode 111 in the vertical direction, namely the thickness direction of the array substrate (the direction perpendicular to the display surface), can be increased, and hence the touch sensitivity of the touch electrode 111 can be improved. On the other hand, in the array substrate provided by the embodiment, as the touch sub-electrodes are arranged in the same layer as the conductive structures in the array substrate, the material and the process of forming the touch sub-electrodes can be reduced, and hence the cost can be reduced.

It should be noted that the touch electrode 111 in the array substrate provided by the embodiment is not limited to include two touch sub-electrodes and may also include three, four, five or more touch sub-electrodes. Meanwhile, the touch sub-electrodes may be arranged in the same layer as the conductive structures of the array substrate and may also be independently arranged. No limitation will be given here.

For instance, the array substrate provided by one example of the embodiment may further comprise at least one lead 125 and a touch detection chip 130. The specific setting ways and the positional relationships refer to the relevant description in the first embodiment. No further description will be given here.

In the array substrate provided by the embodiment, the touch electrode 111 may be a self-capacitive touch electrode. When a finger touches the position of the touch electrode 111 on a side of the display device employing the array substrate provided by the embodiment, the capacitance of the finger is coupled to the first touch sub-electrode 11101 and/or the second touch sub-electrode 11102 of the touch electrode 111, so that the capacitance of the touch electrode 111 can be changed. The touch detection chip 130 determines the touch position by detecting the capacitance variation of the self-capacitance electrodes, so as to achieve the touch control of the display panel/display device employing the array substrate provided by the embodiment. For instance, when a plurality of touch electrodes 111 are arranged, the touch electrodes may also be provided as mutual-capacitance touch electrodes, and the touch detection chip 130 is configured to provide corresponding detection.

Fourth Embodiment

The embodiment provides an array substrate. The array substrate comprises a base substrate 101. The base substrate 101 includes a display area 1011 and a peripheral area 1012 encircling the display area 1011; a pixel array structure 120 is formed in the display area 1011; and at least one touch electrode 111 is disposed in the peripheral area 1012 and arranged along the edge of the base substrate 101. Moreover, the edge of the at least one touch electrode 111 is parallel and flush with the edge of the base substrate 101.

Figure 9:
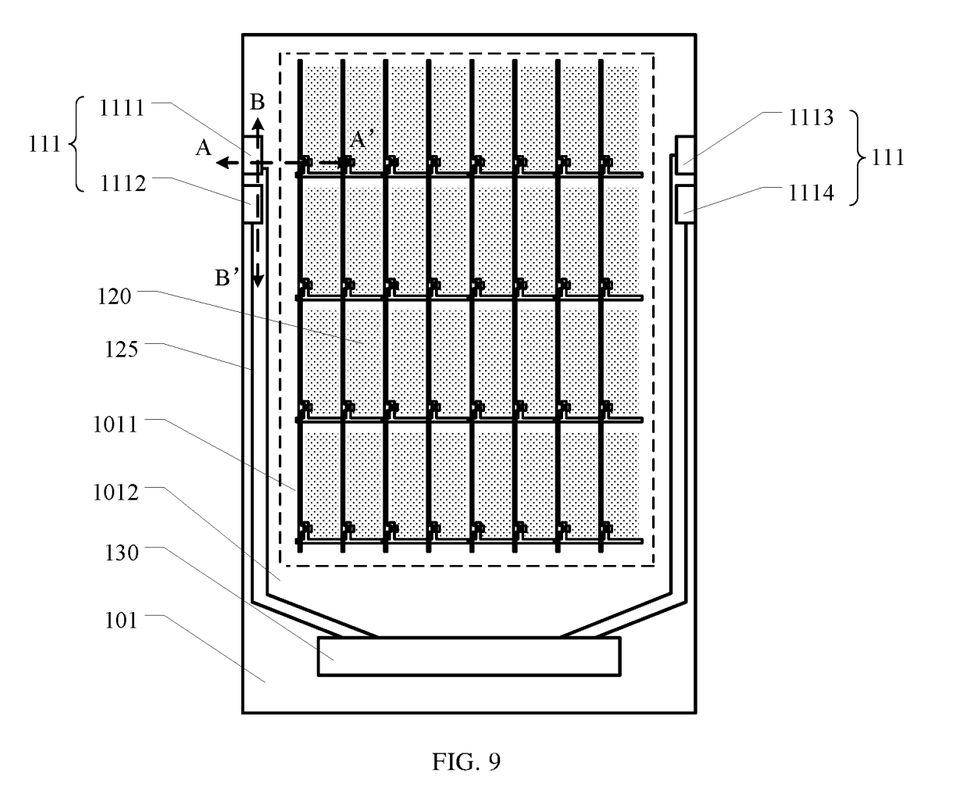
FIG. 9 is a schematic plan view of another array substrate provided by one embodiment of the present disclosure.

As illustrated in FIG. 9, the array substrate comprises a plurality of touch electrodes disposed on the edge of the base substrate 101. For instance, the plurality of touch electrodes include a first touch electrode 1111, a second touch electrode 1112, a third touch electrode 1113 and a fourth touch electrode 1114.

It should be noted that: in the array substrate provided by the embodiment, as the edge of the touch electrode 111 is parallel and flush with the edge of the base substrate 101, the touch electrode 111 may be closer to the bezel of a display device employing the array substrate, so that the touch sensitivity of the touch electrode 111 can be improved.

Figure 10:
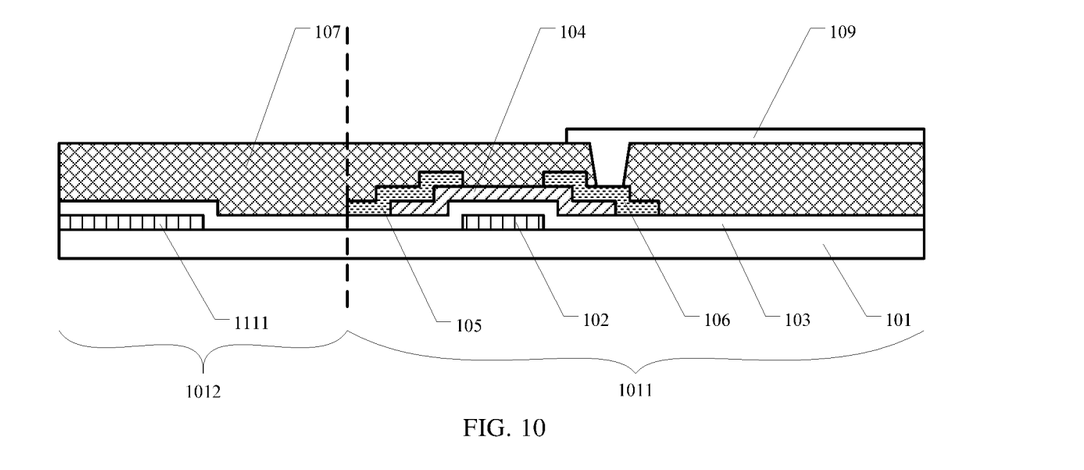
FIG. 10 is a schematic partial sectional view of another array substrate provided by one embodiment of the present disclosure along the direction A-A' in FIG. 9.

FIG. 10 is a schematic partial sectional view of an array substrate provided by the embodiment along the direction A-A' in FIG. 9. As shown in the figure, the array substrate comprises a base substrate 101 which includes a display area 1011 and a peripheral area 1012. The base substrate 101 includes gate electrodes 102 disposed in the display area 1011 on the base substrate 101, a touch electrode 111 disposed in the peripheral area 1012 on the base substrate 101 and arranged in parallel along the edge of the base substrate 101, a gate insulating layer 103 covering the gate electrodes 102, active layers 104 disposed at positions on the gate insulating layer 103 corresponding to the gate electrodes 102, source electrodes 105 and drain electrodes 106 arranged on the active layers 104 and disposed on both sides of the active layers 104, a passivation layer 107 covering the entire base substrate 101, and anodes 109 disposed in the display area 1011 on the passivation layer 107.

Obviously, the array substrate may be taken as an array substrate of an OLED display device. It should be noted that the anodes 109 may be also taken as pixel electrodes of an array substrate of an LCD. The LCD may be in a vertical alignment (VA) mode, a twisted nematic (TN) mode, an in-plane switching (IPS) mode, an advanced super dimension switch (ADS) mode, or the like mode.

For instance, the base substrate 101 may be a glass substrate, a quartz substrate or other substrate. The gate electrode 102 is made from one or more selected from the group consisting of aluminum, titanium, tantalum, chromium, molybdenum, molybdenum tungsten, or one or more of any alloys of the above metals. For instance, the source electrode 105 and the drain electrode 106 is made from one or more selected from the group consisting of aluminum, titanium, tantalum, chromium, molybdenum, molybdenum tungsten, or one or more of any alloys of the above metals. For instance, the anode 109 may be made from a transparent metal oxide such as indium tin oxide (ITO) or indium zinc oxide (IZO). That is to say, the gate electrode 102, the source electrode 105, the drain electrode 106 and the anode 109 may all be conductive structures.

The first touch electrode 1111, the second touch electrode 1112, the third touch electrode 1113 and the fourth touch electrode 1114 may be arranged in the same layer and may be arranged in the same layer as any one conductive structure among the gate electrodes 102, the source electrodes 105, the drain electrodes 106 and the anodes 109. It should be noted that the first touch electrode 1111, the second touch electrode 1112, the third touch electrode 1113 and the fourth touch electrode 1114 may also be not arranged in the same layer as the conductive structures, namely may be independently arranged. In the array substrate provided by the embodiment, as the first touch electrode 1111, the second touch electrode 1112, the third touch electrode 1113 and the fourth touch electrode 1114 are arranged in the same layer as any one layer of conductive structure in the array substrate, the material and the process of forming the touch electrode 111 can be reduced, and hence the cost can be reduced. Of course, the array substrate provided by the embodiment includes but not limited thereto. The first touch electrode 1111, the second touch electrode 1112, the third touch electrode 1113 and the fourth touch electrode 1114 may also be arranged in different layers.

Figure 11:
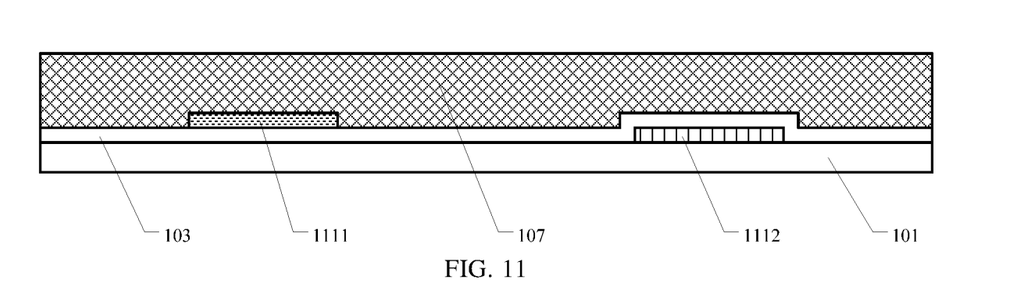
FIG. 11 is a schematic partial sectional view of another array substrate provided by one embodiment of the present disclosure along the direction B-B' in FIG. 9.

For instance, FIG. 11 is a schematic partial sectional view of the array substrate provided by the embodiment along the direction B-B' in FIG. 9. As shown in the figure, the array substrate comprises a base substrate 101, a first touch electrode 1111 disposed on the base substrate 101, a gate insulating layer 103 being disposed on the first touch electrode 1111 and covering the entire base substrate 101, a second touch electrode 1112 disposed on the gate insulating layer 103, and a passivation layer 107 being disposed on the second touch electrode 1112 and covering the entire base substrate 101. Obviously, the first touch electrode 1111 and the second touch electrode 1112 are arranged in different layers on the array substrate. For instance, the second touch electrode 1112 may be arranged in the same layer as a gate electrode layer, and the first touch electrode 1111 may be arranged in the same layer as a source/drain electrode layer.

It should be noted that the array substrate provided by the embodiment includes but not limited to four touch sub-electrodes and may also include five, six, seven or more touch electrodes. No limitation will be given here.

For instance, the array substrate provided by one example of the embodiment further comprises at least one lead 125 which is electrically connected with the at least one touch electrode 111 for signal input/output. For instance, as illustrated in FIG. 9, the array substrate comprises four leads 125 which are respectively electrically connected with the first touch electrode 1111, the second touch electrode 1112, the third touch electrode 1113 and the fourth touch electrode 1114.

For instance, in the array substrate provided by the embodiment, the four leads 125 may be arranged in the same layer as any one layer of conductive structure in the array substrate and formed by the same conductive layer via one patterning process. It should be noted that the leads 125 may also be independently arranged. The leads 125 may also be arranged in different layers. For instance, the plurality of leads may be arranged in the same layer as a plurality of conductive structures in the array substrate. For instance, partial leads are arranged in the same layer as the gate electrode layer, and partial leads are arranged in the same layer as the source/drain electrode layer. In the array substrate provided by the embodiment, as the leads 125 are arranged in the same layer as at least one layer of conductive structure in the array substrate, the material and the process of forming the leads 125 can be saved, and hence the cost can be reduced.

In addition, the four leads 125 may be arranged in the same layer as the first touch electrode 1111, the second touch electrode 1112, the third touch electrode 1113 and the fourth touch electrode 1114 and may also be arranged in different layers from the first touch electrode 1111, the second touch electrode 1112, the third touch electrode 1113 and the fourth touch electrode 1114. For instance, when the leads 125 are arranged in different layers from the first touch electrode 1111, the second touch electrode 1112, the third touch electrode 1113 and the fourth touch electrode 1114, the electrical connection between the touch electrodes and corresponding leads can be achieved by general connection means such as through holes.

For instance, the array substrate provided by one example of the embodiment further comprises a touch detection chip 130. For instance, as illustrated in FIG. 9, the array substrate comprises a touch detection chip 130. The touch detection chip 130 may be disposed in the peripheral area 1012 of the base substrate 101 and connected with the four leads 125.

In the array substrate provided by the embodiment, the touch electrodes 111 may be self-capacitive touch electrodes. When a finger touches the position of the touch electrodes on a side of a display panel/display device employing the array substrate provided by the embodiment, the capacitance of the finger senses one or more touch electrodes 111, so that the capacitance of the touched touch electrodes can be changed. The touch detection chip 130 determines the touch position by detecting the capacitance variation of the self-capacitive electrodes, so as to achieve the control of the display panel/display device employing the array substrate provided by the embodiment.

In the array substrate provided by the embodiment, the plurality of touch electrodes may include touch drive electrodes and touch sensing electrodes, so as to form mutual-capacitance touch electrodes. Capacitance will be formed at positions at which the touch drive electrodes and the touch sensing electrodes are intersected. When a finger touches a capacitive touch panel (CTP), the coupling of two electrodes near a touch point is affected, so that the capacitance of the two electrodes can be changed. The touch detection chip determines the touch position by detecting the capacitance variation in the touch period.

Fifth Embodiment

The embodiment provides a display panel, which comprises an array substrate and an opposing substrate 160 which are cell-assembled together. The array substrate is the array substrate provided by any one of the embodiments 1 to 4. For instance, the display device may be an LCD device or an OLED display device.

Figure 12:
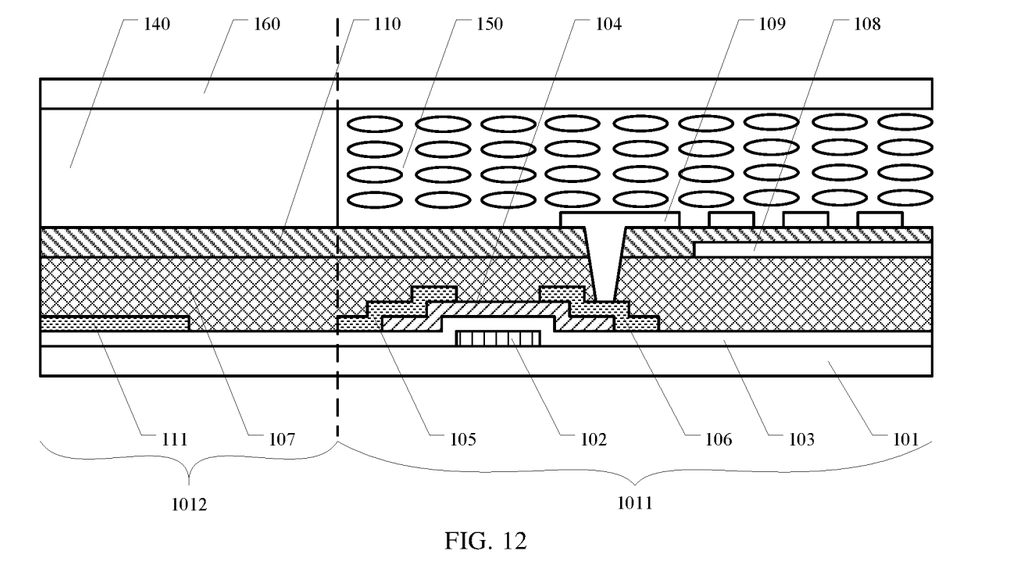
FIG. 12 is a schematic partial sectional view of a display panel provided by one embodiment of the present disclosure along the direction A-A' in FIG. 9.

For instance, FIG. 12 is a schematic partial sectional view of a display panel provided by the embodiment. The display panel comprises the array substrate provided by the first embodiment. The technical characteristics, the positional relationships and the connection relationships of the technical characteristics, and the like refer to the relevant description in the first embodiment. No further description will be given here. As illustrated in FIG. 12, the display panel further comprises a liquid crystal layer 150 disposed in the display area 1011 of the base substrate 101 on the array substrate, sealant 140 disposed in the peripheral area 1012 of the base substrate 101 on the array substrate, and an opposing substrate 160 disposed on the liquid crystal layer 150 and the sealant, so as to form a liquid crystal cell. The opposing substrate and the array substrate are arranged opposite to each other and are respectively an upper substrate and a lower substrate of a display panel. For instance, display structures such as a thin-film transistor (TFT) array are generally formed on the array substrate, and color resin is formed on the opposing substrate. For instance, the opposing substrate is a color filter (CF) substrate.

Figure 13:
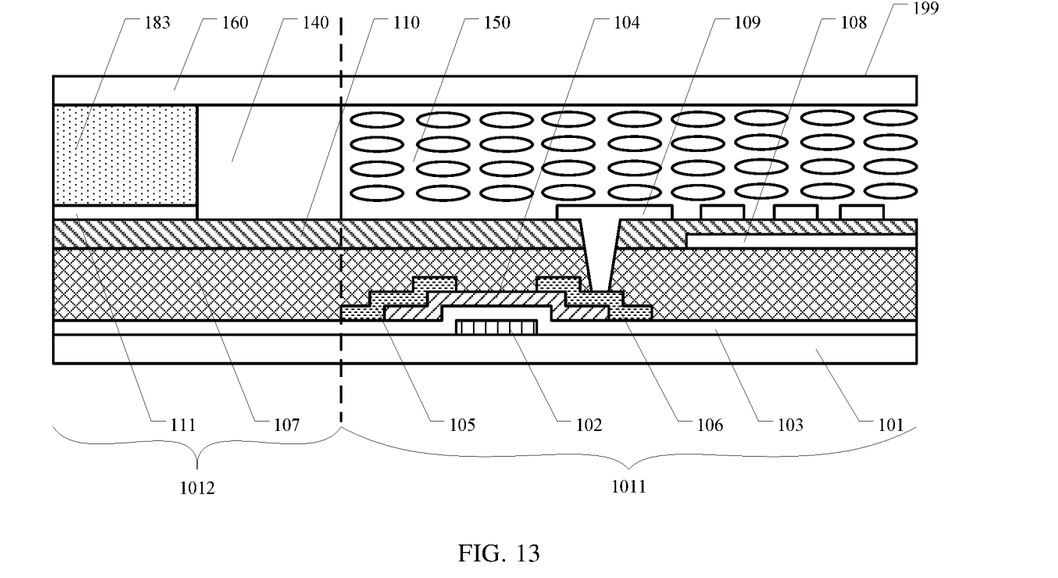
FIG. 13 is a schematic partial sectional view of another display panel provided by one embodiment of the present disclosure along the direction A-A' in FIG. 9.

For instance, as illustrated in FIG. 13, the display panel provided by one example of the embodiment further comprises a second conductive particle layer 183 disposed between the at least one touch electrode of the array substrate and the opposing substrate 160. The second conductive particle layer 183 is disposed on the at least one touch electrode 111 in the peripheral area 1012 of the base substrate 101 of the array substrate and correspondingly electrically connected with the touch electrode 111.

For instance, the touch electrodes may also adopt the second conductive particle layers. At least one second conductive particle layer may be respectively connected with the touch detection chip via a lead. In this case, the setting ways of the leads may refer to the description with respect to the setting ways of the leads in the embodiments.

For instance, FIG. 13 is a schematic partial sectional view of a display panel provided by the embodiment. The display panel comprises the array substrate provided by the first embodiment. The technical characteristics, the positional relationships and the connection relationships of the technical characteristic, and the like refer to the relevant description in the first embodiment. No further description will be given here. As illustrated In FIG. 13, the display panel further comprises a second conductive particle layer 183 disposed in the sealant 140 between the array substrate and the opposing substrate 160. The second conductive particle layer 183 is disposed on the touch electrode 111 and directly electrically connected with the touch electrode 111.

For instance, the second conductive particle layer 183 may be made of anisotropic conductive adhesive.

For instance, the relevant characteristics of the second conductive particle layer 183 may refer to the description with respect to the first conductive particle layer 180. The display panel provided by the embodiment includes but not limited thereto.

Figure 14:
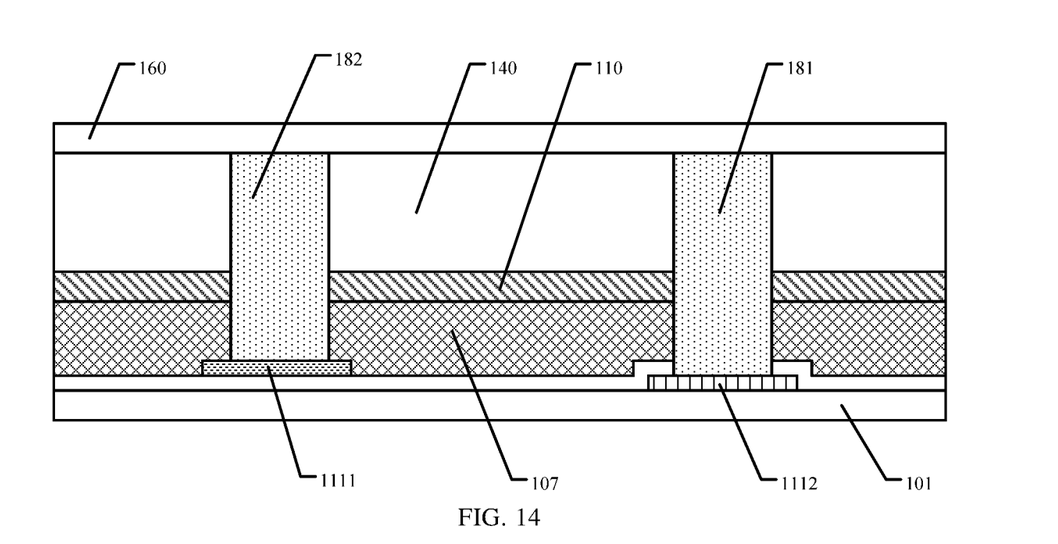
FIG. 14 is a schematic partial sectional view of another display panel provided by one embodiment of the present disclosure along the direction B-B' in FIG. 9.

For instance, as illustrated in FIG. 14, the display panel comprises a first touch electrode 1111 formed on the base substrate 101 and arranged in the same layer as the gate electrodes 102, and a second touch electrode 1112 arranged in the same layer as the source electrodes 105 and the drain electrodes 106. The display panel further comprises a first metal ball layer 181 and a second metal ball layer 182 interposed between the base substrate 101 of the array substrate and the opposing substrate 160. The first metal ball layer 181 is disposed on the first touch electrode 1111 and electrically connected with the first touch electrode 1111. The second metal ball layer 182 is disposed on the second touch electrode 1112 and electrically connected with the second touch electrode 1112. Description is given here by taking the first metal ball layer and the second metal ball layer as an example. For instance, the first metal ball layer and the second metal ball layer include sealant doped with conductive metal balls. For instance, the second conductive particle layer 183 may also adopt other conductive particles.

In the display panel provided by the embodiment, as the second conductive particle layer 183 is disposed between the array substrate and the opposing substrate 160, the sensing range of the touch electrode 111 in the vertical direction, namely the thickness direction of the display panel (the direction perpendicular to a display surface 199), can be increased, and hence the touch sensitivity of the display panel can be improved.

For instance, the touch electrode structure in the embodiments of the present disclosure includes but not limited to side touch (perpendicular to the display surface). For instance, a finger may also touch the display surface to achieve touch control.

It should be noted that: obviously, the display panel provided by the embodiment may further comprise the array substrate according to any one of the embodiments 1 to 4. The specific configuration will no longer be enumerated.

Sixth Embodiment

The embodiment provides a display device, which comprises any display panel provided by the fifth embodiment.

Figure 15:
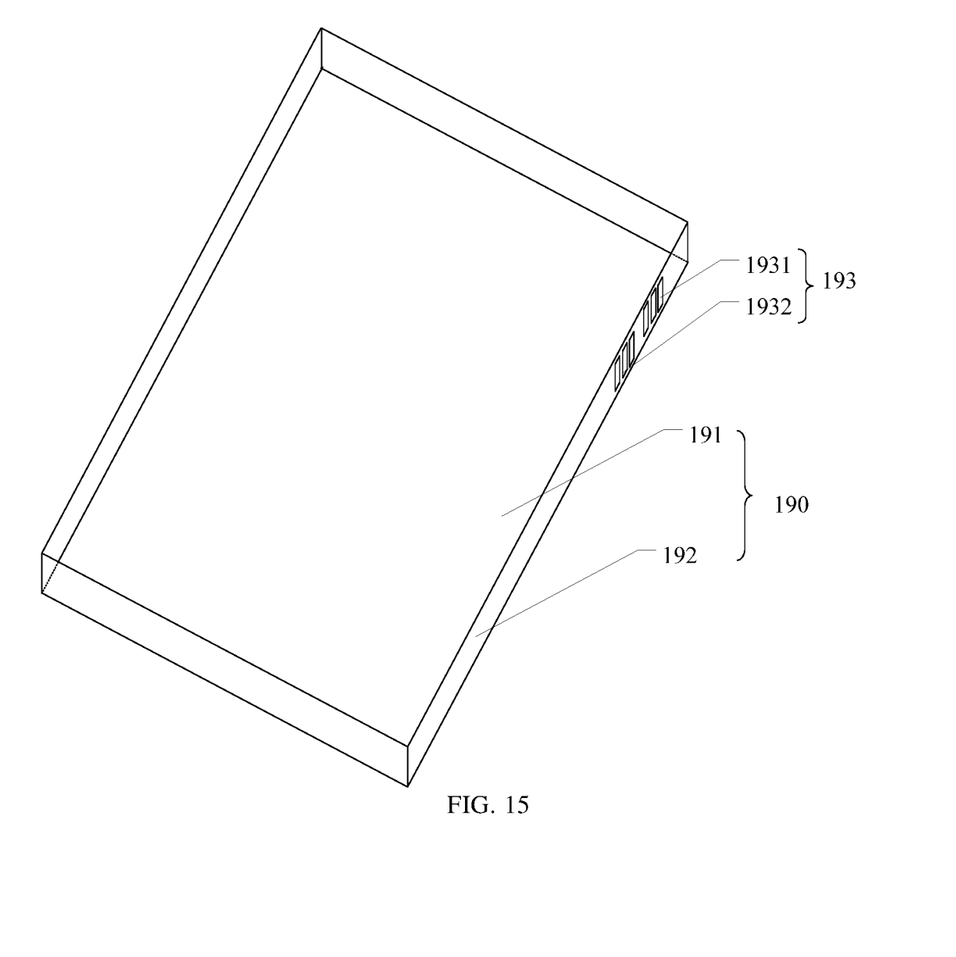
FIG. 15 is a schematic structural view of a backplane of a display device provided by one embodiment of the present disclosure.

For instance, as illustrated in FIG. 15, the display device provided by the embodiment may further comprise a backplane 190. The backplane 190 includes a bottom plate 191 and a plurality of side plates 192 disposed on the periphery of the bottom plate. The material of the backplane includes plastics or metal. When the backplane is made from metal, a hollowed-out structure 193 is disposed at the position of a side plate corresponding to the at least one touch electrode. Thus, the at least one touch electrode 111 will not be shielded, so that the control function of the display device can be achieved. FIG. 15 illustrates two hollowed-out structures respectively corresponding to two touch electrodes: a first hollowed-out structure 1931 and a second hollowed-out structure 1932. For instance, each hollowed-out structure may include at least one hole running through the side plate. For instance, the number of the hollowed-out structures may be determined by the number of the touch electrodes. Of course, when the backplane is made from plastics, the hollowed-out structure may also be arranged. The case may refer to the hollowed-out structure arranged when the backplane is made from metal.

It should be noted that not all the structures of the display device are provided for clear description. In order to achieve necessary functions of the display device, other structures which are not shown may be arranged by those skilled in the art according to specific application scenes. No limitation will be given in the present disclosure. The technical effect of the display device provided by the embodiment refers to the technical effect of the array substrate provided by the embodiments 1 to 4. No further description will be given here.

It should be noted that: when the array substrate, the display panel or the display device provided by the embodiment of the present disclosure is adopted, in order to avoid false operation due to error contact, corresponding anti-error-contact programs may be designed to avoid the inconvenience brought to users by false operation. For instance, the device may be set to wake up by continuous contact in two or three times.

For instance, the touch electrodes may correspondingly replace physical keys such as ON/OFF and VOLUME which are generally arranged on the side (perpendicular to the display surface) of the display panel.

The following points should be noted:

(1) The accompanying drawings of the embodiments of the present disclosure only involve the structures described in the embodiments of the present disclosure, and other structures may refer to general design.

(2) For clarity, the thickness of layers or areas is enlarged or decreased in the accompanying drawings of the embodiments of the present disclosure, namely the accompanying drawings are not drawn according to actual scale. It should be understood that: when an element such as a layer, a film, an area and a substrate is referred to be disposed "above" or "below" another element, the element may be "directly" disposed "on" or "beneath" another element, or an intermediate element may be provided.

(3) The embodiments of the present disclosure and the characteristics in the embodiments may be mutually combined to obtain new embodiments in the absence of conflict.

The foregoing is only the preferred embodiments of the present disclosure and not intended to limit the scope of protection of the present disclosure. Any change or replacement that may be easily thought of by those skilled in the art within the technical scope disclosed by the present disclosure shall fall within the scope of protection of the present disclosure. Therefore, the scope of protection of the present disclosure shall be defined by the appended claims.

The application claims priority to the Chinese patent application No. 201510587675.5, filed on Sep. 15, 2015, the entire disclosure of which is incorporated herein by reference as part of the present application.

What is claimed is:

1. An array substrate, comprising a base substrate, wherein the base substrate includes a display area and a peripheral area encircling the display area; a pixel array structure is disposed in the display area; and a touch eletrode is disposed in the peripheral area and arranged along an edge of the base substrate,
wherein the pixel array structure includes a gate electrode layer and a source/drain electrode layer, and the touch electrode includes a first touch sub-electrode and a second touch sub-electrode;
the first touch sub-electrode is in a same layer as the gate electrode layer, and the second touch sub-electrode is in a same layer as the source/drain electrode layer; and the first touch sub-electrode and the second touch sub-electrode are electrically connected with each other by directly contacting each other.

2. The array substrate according to clam 1, wherein the base substrate and the touch electrode each have a first surface and a second surface connected with each other, the touch electrode is on the first surface of the base substrate and the first surface of the touch electrode is connected with the first surface of the base substrate, and the second surface of the touch electrode is parallel and flush with the second surface of the base substrate.

3. The array substrate according to claim 1, wherein a number of the touch electrodes is plural.

4. The array substrate according to claim 1, wherein a first conductive particle layer is disposed on the touch electrode, arranged in the peripheral area of the base substrate, and electrically connected with the corresponding touch electrode.

5. The array substrate according to claim 1, further comprising a lead which is electrically connected with the touch electrode for signal input/output.

6. The array substrate according to claim 5, wherein the lead is connected with a touch detection chip.

7. The array substrate according to claim 1, wherein the touch electrode is a self-capacitive electrode; or a number of the touch electrodes is plural, and the plurality of touch electrodes include touch drive electrodes and touch sensing electrodes.

8. A display panel, comprising an array substrate and an opposing substrate which are cell-assembled together, wherein the array substrate is the array substrate according to claim 1.

9. The display panel according to claim 8, further comprising a second conductive particle layer disposed between the touch electrode of the array substrate and the opposing substrate, wherein the second conductive particle layer is disposed on the touch electrode in the peripheral area and correspondingly electrically connected with the touch electrode.

10. The display panel according to claim 9, wherein the second conductive particle layer includes anisotropic conductive adhesive.

11. A display device, comprising the display panel according to claim 8.

12. The display device according to claim 11, further comprising a backplane, wherein the backplane includes a bottom plate and a plurality of side plates disposed on the periphery of the bottom plate; and a hollowed-out structure is disposed at a position of a side plate corresponding to the touch electrode.

* * * * *

UNITED STATES PATENT AND TRADEMARK OFFICE
CERTIFICATE OF CORRECTION

PATENT NO. : 10,591,764 B2
APPLICATION NO. : 15/309266
DATED : March 17, 2020
INVENTOR(S) : Xiaochuan Chen et al.

Page 1 of 1

It is certified that error appears in the above-identified patent and that said Letters Patent is hereby corrected as shown below:

On the Title Page

Item (86), should read:
(86) PCT Number PCT/CN2016/073281

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*